United States Patent
Inskeep

(10) Patent No.: US 10,382,130 B1
(45) Date of Patent: Aug. 13, 2019

(54) DUAL MODE VEHICLE CAMERA FOR VISUAL LIGHT COMMUNICATION

(71) Applicant: Ford Global Technologies, LLC, Dearborn, MI (US)

(72) Inventor: Grant Inskeep, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/118,735

(22) Filed: Aug. 31, 2018

(51) Int. Cl.
| | |
|---|---|
| *H04B 10/116* | (2013.01) |
| *G02B 7/02* | (2006.01) |
| *H04N 5/225* | (2006.01) |
| *H04N 5/232* | (2006.01) |
| *H04W 88/06* | (2009.01) |

(52) U.S. Cl.
CPC .......... *H04B 10/116* (2013.01); *G02B 7/02* (2013.01); *H04N 5/2254* (2013.01); *H04N 5/23203* (2013.01); *H04W 88/06* (2013.01)

(58) Field of Classification Search
CPC .......... H04B 10/116; H04N 5/2254; H04N 5/23203; H04W 88/06; G02B 7/02
USPC ........................................................ 398/172
See application file for complete search history.

(56) References Cited

U.S. PATENT DOCUMENTS

| | | |
|---|---|---|
| 8,965,218 B2 | 2/2015 | Son et al. |
| 9,172,464 B2 | 10/2015 | Liu et al. |
| 9,252,879 B2 | 2/2016 | Muguruma |
| 2011/0051260 A1* | 3/2011 | Nakayama ............. G02B 5/205 359/738 |
| 2013/0251374 A1* | 9/2013 | Chen ................... H04B 10/1141 398/118 |
| 2014/0300809 A1* | 10/2014 | Oliveira ................. H04N 5/232 348/376 |
| 2016/0301470 A1 | 10/2016 | Zhi et al. |
| 2018/0035019 A1 | 2/2018 | Back et al. |
| 2019/0025541 A1* | 1/2019 | Wada ........................ G02B 7/09 |
| 2019/0047558 A1* | 2/2019 | Relihan ............. B60W 30/0956 |
| 2019/0052359 A1* | 2/2019 | Brady .................. H04B 10/116 |

FOREIGN PATENT DOCUMENTS

| | | |
|---|---|---|
| CN | 105703839 B | 1/1918 |
| CN | 103795467 A | 5/2014 |
| CN | 103905119 A | 7/2014 |

(Continued)

OTHER PUBLICATIONS

Isamu Takai et al., *LED and CMOS Image Sensor Based Optical Wireless Communication System for Automotive Applications*, vol. 5, No. 5, 2013, 19 pages.

*Primary Examiner* — Dalzid E Singh
(74) *Attorney, Agent, or Firm* — Frank Lollo; Neal, Gerber & Eisenberg LLP; James P. Muraff

(57) ABSTRACT

Method and apparatus are disclosed for a dual mode vehicle camera for visual light communication. An example vehicle includes a camera, a visual light communication (VLC) module, and a camera module. The camera includes a lens removable from a light path between an aperture and a CMOS sensor. The VLC module is communicatively coupled to the camera. The VLC module selects between first and second modes, and when in the second mode, removes the lens from the light path to receive VLC data via the camera. Additionally, the camera module captures images via camera when the VLC module selects the first mode.

18 Claims, 4 Drawing Sheets

(56) References Cited

FOREIGN PATENT DOCUMENTS

| | | | |
|---|---|---|---|
| JP | 2005236667 | A | 9/2005 |
| JP | 2007013786 | A | 1/2007 |
| JP | 5658985 | B2 | 1/2015 |

* cited by examiner

DUAL MODE VEHICLE CAMERA FOR VISUAL LIGHT COMMUNICATION

TECHNICAL FIELD

The present disclosure generally relates to vehicle-to-vehicle communication and, more specifically, a dual mode vehicle camera for visual light communication.

BACKGROUND

Increasingly, vehicles are using vehicle-to-vehicle communication to exchange safety information and coordinate movement. Visual Light Communication (VLC) is a technique that vehicles can use to communicate. VLC transmitters use light emitting diodes (LEDs) to transmit data packets by modulating the LED. VLC receivers use image sensors with a rolling shutter mechanism. For example, the image sensor may be a CMOS sensor or a photo diode. This results in temporal aliasing where the column of pixels in the image that capture artifacts in fast moving objects or fast change in lighting levels during the image capture. In such a manner, the VLC receivers demodulate the light from the LED into binary data.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a dual mode vehicle camera for visual light communication. An example vehicle includes a camera, a visual light communication (VLC) module, and a camera module. The camera includes a lens removable from a light path between an aperture and a CMOS sensor. The VLC module is communicatively coupled to the camera. The VLC module selects between first and second modes, and when in the second mode, removes the lens from the light path to receive VLC data via the camera. Additionally, the camera module captures images via camera when the VLC module selects the first mode.

A dual mode camera for a vehicle includes a CMOS sensor and a housing that defines an aperture through which light enters. The camera also includes a body that defines a light path from the aperture to the CMOS sensor. Additionally, the camera includes a lens removable from a light path. The camera removes the lens from the light path in response to receiving a command from a visual light communication (VLC) module of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
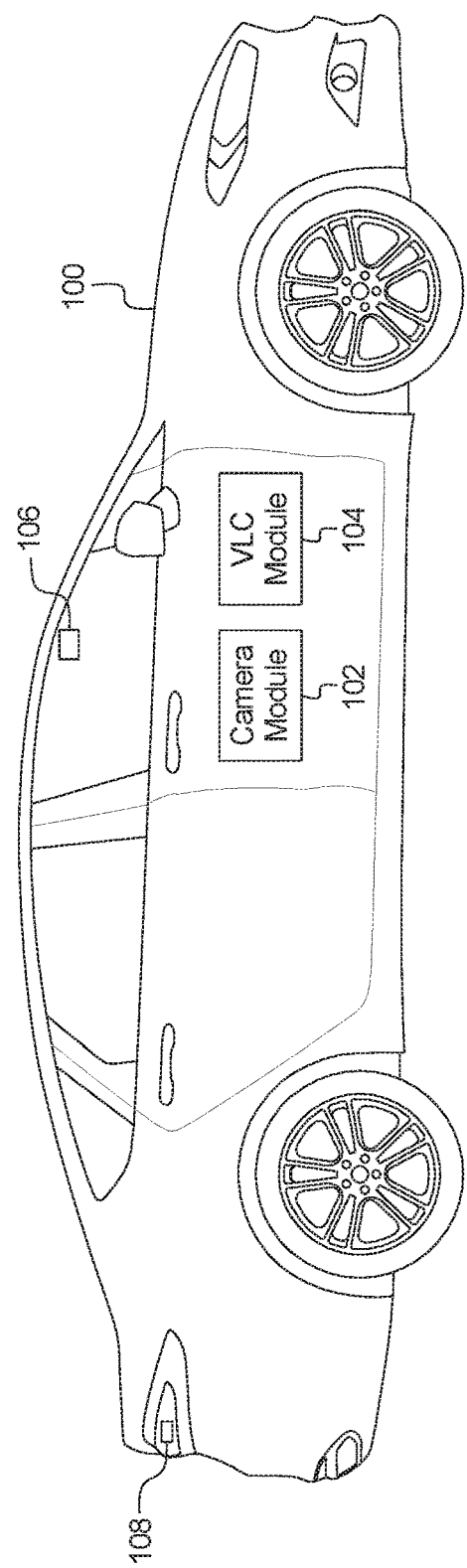
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles that implement vehicle-to-vehicle communication can implement it using Visual Light Communication (VLC). VLC uses changes in light transmitted by a light source (such as an LED) to transmit data packets. A VLC transmitter modulates the light. A VLC receiver can use a CMOS sensor with rolling shutter to transform the modulating light signal into a serial string of binary numbers that can be further processed by a circuit. However, traditionally the camera of the receiver needs to be close to the transmitting LED of the transmitter so that the light from the LED completely covers the entire or large part of the CMOS sensor. When the light from the LED does not cover the entire CMOS sensor of a camera, then data is lost on the edges of the frame. A lens focuses light onto the CMOS image sensor from the subject matter of interest rather to capture an unfiltered image. Unlike taking an image, VLC receiver it does not care about the subject matter in the frame but rather the light surrounding it.

As described below, a dual mode camera includes a lens that moves in and out of a light path of the camera. Light enters an aperture and travels to a CMOS sensors. The dual mode camera includes a mode to capture images and a mode for VLC. In the image capture mode, the lens is in the light path to focus the light onto the sensor. In the VLC mode, the lens is removed from the light path so that the light in the light path is diffuse when encountering the CMOS sensor. In some examples, the lens is mounted on a rotational motor that rotates the lens into a position out of the light path. In some such examples, the lens rotates about an axis that intersects one of the edges of the lens (e.g., the lens rotates from perpendicular the light path to substantially parallel to the light path, etc.). Alternatively, in some examples, the lens rotates between a transparent or semi-transparent panel and a lens. In such examples, the transparent or semi-transparent panel and does not focus the light. In some examples, the lens is mounted to be retracted into a cavity. In some such examples, the lens is coupled to a transparent or semi-transparent panel so that when the lens in retracted into the cavity, the transparent or semi-transparent panel enters the light path and vice versa. In some such examples, the semi-transparent panel includes a thin film that disperses the light evenly across the CMOS sensor.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes a camera module 102 and a visible light communication (VLC) module 104, and a dual mode camera 106.

The camera module 102 receives input from various cameras (e.g., rear view cameras, dashboard cameras), including the dual mode camera 106. The camera module 102 processes the image to perform different tasks. For example, the camera module 102 may be part of an autonomy unit that analyzes the images received from the camera to enable autonomous of semi-autonomous features (such as autopilot, parking assist, remote assist parking, autonomous navigation, lane departure warning, blind spot detection, etc.). As another example, the camera module 102 may be communicatively coupled to or incorporated with an infotainment head unit to display the captured images to occupants of the vehicle 100.

The VLC module 104 transmits and receives messages based on visible light. In the illustrated example, the VLC module 104 is communicatively connected to a VLC transmitter 108. The VLC transmitter 108 is a light source, such as a light emitting diode (LED). In some examples, the VLC transmitter 108 is incorporated into the lights of the vehicle 100 (e.g., the headlights, the brake lights, etc.). The VLC module 104 modulates the VLC transmitter 108 to serially transmit data as a time dependent series of on and off signals. In some examples, the VLC module 104 also modulates intensity and/or color of the VLC transmitter 108. Generally, the rate at which the VLC transmitter 108 modulates the LED is imperceptible to the human eye. Examples of transmitting data are described in "Robust Visual Light Communication For Vehicle-To-Vehicle Communication," application Ser. No. 16/118,742, filed on Aug. 31, 2018, which is hereby incorporated by reference in its entirety. FIG. 1 illustrates one VLC transmitter 108 as a back of the vehicle 100 (e.g., incorporated in the brake lights). However, the vehicle 100 may include multiple VLC transmitters 108 located at different point of the vehicle 100, such as being incorporated into the headlights.

To receive data, the VLC module 104 receives data from the dual mode camera 106. The VLC module 104 processes the received data and transmits the data to one of the electronic control units (ECUs). For example, the VLC module 104 may transmit and receive safety messages as part of a vehicle-to-vehicle communication system. These safety messages include, for example, speed, position, trajectory, and/or lane data of the transmitting vehicle and hazard information (e.g., detection of ice or water on the surface of the roadway etc.) detected by the transmitting vehicle. The VLC module 104 controls the mode of the dual mode camera 106 between a camera mode and a VLC mode.

Figure 2A:
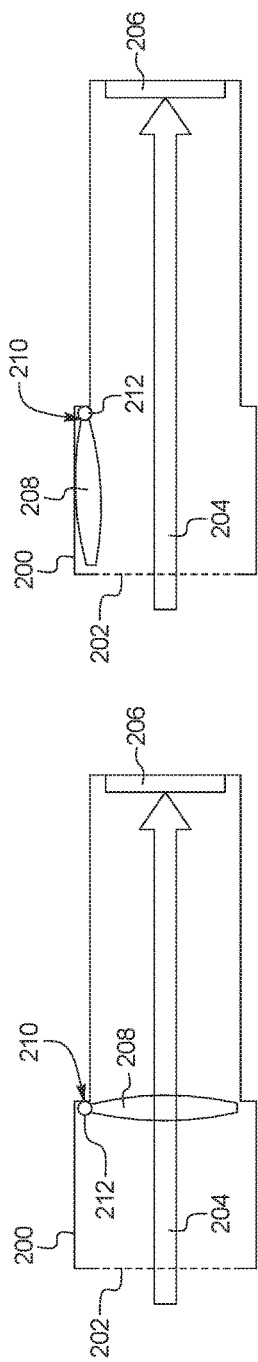
FIGS. 2A, 2B, and 2C illustrate a dual mode camera.
Figure 2B:
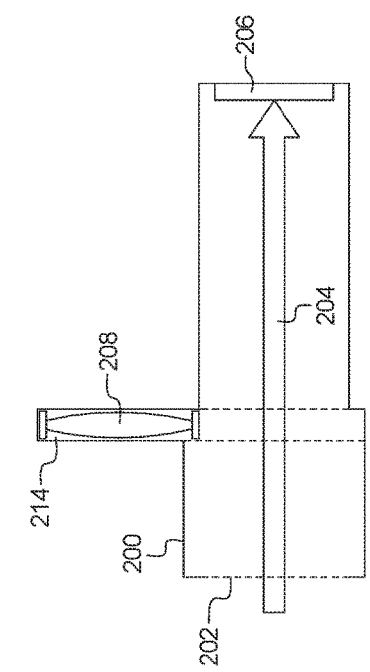
Figure 2C:
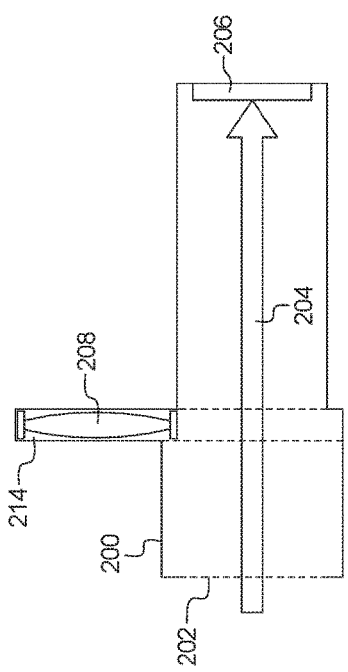

As illustrated in FIGS. 2A, 2B, and 2C, the dual mode camera 106 includes a housing 200 that defines an aperture 202 through which light enters. The housing also defines a light path 204 from the aperture 202 to a CMOS sensor 206. Additionally, the dual mode camera 106 includes a lens 208 removable from the light path 204. The dual mode camera 106 removes the lens 208 from the light path 204 in response to receiving a command from the VLC module 104. In the illustrated example, the dual mode camera 106 is incorporated into the vehicle 100. Alternatively, in some examples, the dual mode camera 106 is a camera or mobile device that is detachably mounted to the vehicle 100 and connected to the camera module 106 and the VLC module 104 (e.g., via a port, connector, or short range wireless connection). In such examples, the camera or mobile device includes the lens 208 that is removable from the light path 204 and may be used for other imaging and/or VLC applications.

The dual mode camera 106 switches between image mode and the VLC mode by adjusting a position of a lens 208 in relation to the light path 204 between the aperture 202 and a CMOS sensor 206. In the camera mode, the lens 208 is positioned in the light path 204 to focus the light onto the CMOS sensor 206. In the VLC mode, the lens 208 is positioned outside of the light path 204 so that relatively more diffuse light (e.g., as comparted to when the lens 208 is in the light path 204) is exposed to the CMOS sensor 206. Additionally, in VLC mode, the CMOS sensor 206 utilizes a rolling shutter mechanism where the charge of the sensor column is converted into a digital signal one column at a time. This results in temporal aliasing where the column of pixels in the image captured in VLC mode reflect the modulation of the VLC transmitter 108. In this manner, the CMOS sensor 206 also other modulation techniques, such as color based modulation, frequency based modulation, pulse position modulation and pulse amplitude based modulation.

FIG. 2A illustrates the dual mode camera 106 in the image mode with the lens 208 in the path of the light path 204. FIG. 2B illustrates an example of the dual mode camera 106 in the VLC mode. In the illustrated example, the lens is rotationally coupled to the housing 200 of the dual mode camera 106. The edge 210 of the lens 208 is connected to a rotating motor 212. In this example, the rotating motor 212 rotates so that the lens 208 transitions from being in the path of the light path 204 to being parallel to the light path 204. In some examples, the lens 208 is biased by torsion coil springs that urge the lens 208 into the light path 204 when the drive motor is not providing tension to compress the springs. FIG. 2C illustrates the lens 208 being attached to a track that moves the lens out of the light path 204 and into a cavity 214. In some example, the lens 208 is coupled to a transparent or semi-transparent panel that attached to the tract that, when the lens 208 is moved into the cavity, the panel moves into the light path 204. In some example, the semi-transparent panel transparent panel includes a thin film that disperses the light evenly across the CMOS sensor 206. In some examples, the lens 208 rotates on an axis parallel to the light path 204 such that the transparent or semi-transparent panel rotates into the place of the lens 208.

In the example illustrated in FIGS. 2A, 2B, and 2C, the lens 208 of the dual mode camera 106 is configured such that the lens 208 is removed from the light path 204 from time to time. Alternatively, in some examples, the dual mode camera 106 is configured so that the light path 204 is rerouted around the lens 208. In some such example, the dual mode camera 106 includes a secondary chamber with movable and stationary mirrors to direct the light path 208. In such examples, in response to receiving a command signal from the VLC module 104, the movable mirrors rotate into the body of the housing 200 before and after the lens 208. In such examples, the light path 204 is redirected into to the secondary chamber by the fore movable mirror, routed through the secondary chamber by stationary mirrors, and in directed on the CMOS sensor 206 by the aft movable mirror.

Figure 3:
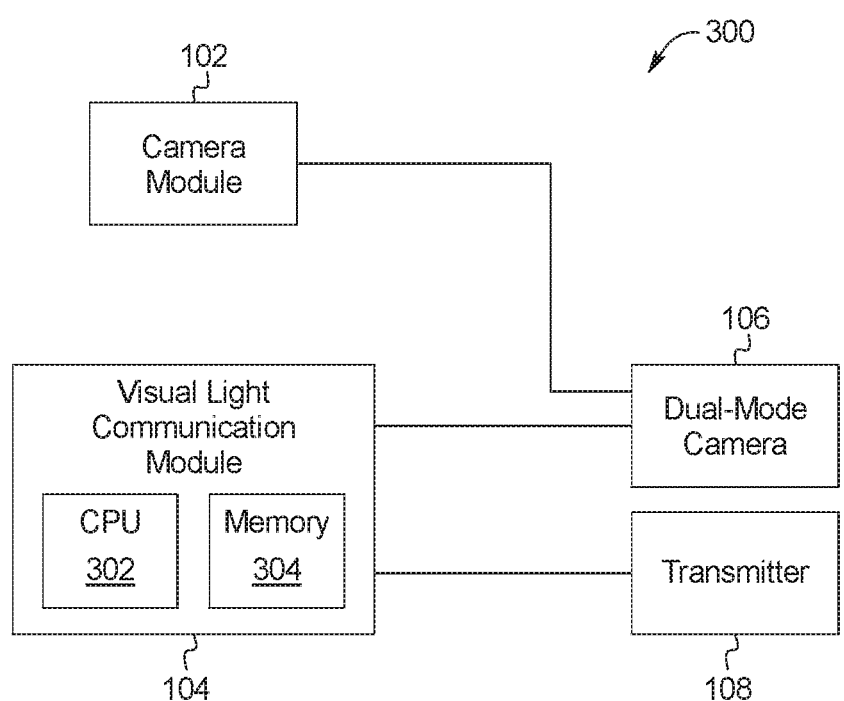
FIG. 3 is a block diagram of electronic components of the vehicle of FIG. 1.

FIG. 3 is a block diagram of electronic components 300 of the vehicle 100 of FIG. 1. In the illustrated example, the electronic components 300 include the camera module 102, the VLC module 104, the dual mode camera 106, and the VLC transmitter 108.

In the illustrated example, the VLC module 104 includes a processor or controller 302 and memory 304. In the illustrated example, the VLC module 104 includes software/firmware to transmit and receive information using a VLC protocol. The VLC module 104 may also be connected to a data bus (e.g., controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc) of the vehicle 100 to communicate with other electronic control units, such as an infotainment head unit, a power train control unit, a telematics unit, etc.

The processor or controller 302 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 304 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 304 includes multiple kinds of memory, particularly volatile memory and non-volatile memory.

The memory 304 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 304, the computer readable medium, and/or within the processor 302 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Figure 4:
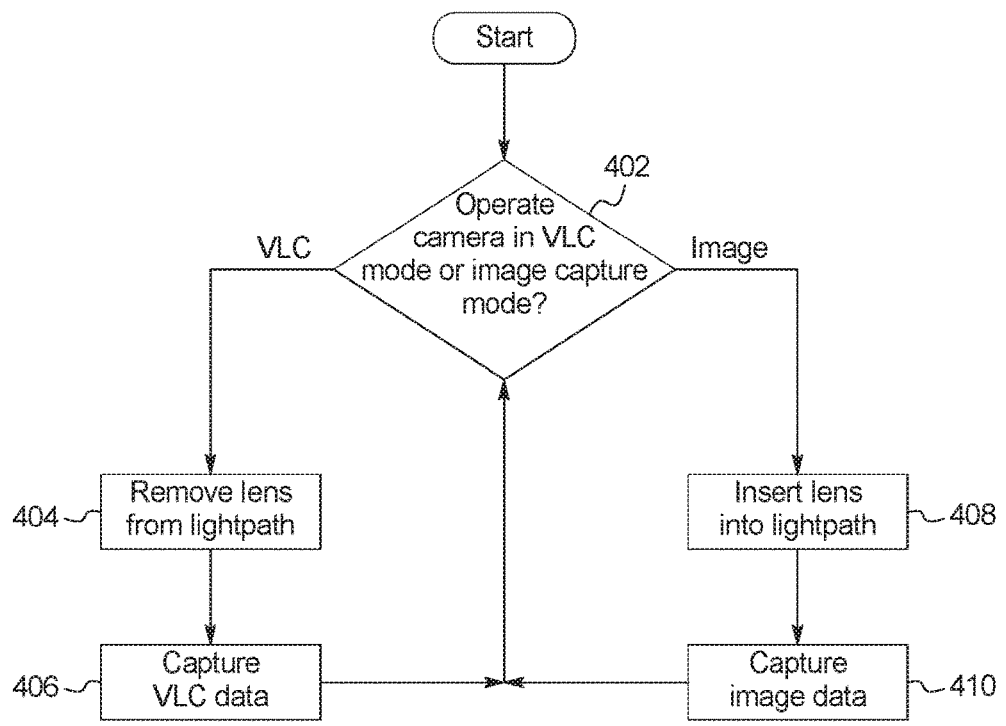
FIG. 4 is a flowchart of a method to operate the dual mode camera of FIGS. 2A, 2B, and 2C, which may be implemented by the electronic components of FIG. 3.

FIG. 4 is a flowchart of a method to operate the dual mode camera of FIGS. 1, 2A, 2B, 2C, and 3 which may be implemented by the electronic components 300 of FIG. 3. Initially, at block 402, the VLC module 104 determines whether to operate the dual mode camera 106 in the VLC mode or the image mode. In some examples, the default mode for the dual mode camera 106 may be the image mode The VLC module 104 may determine that the dual mode camera 106 should be in the VLC mode upon, for example, receiving a signal detectable in the image mode that a vehicle in front of the vehicle 100 is transmitting VLC data (e.g., a specific tail light pattern discernable while in image mode). As another example, the VLC module 104 may periodically (e.g., every 10 milliseconds, every 50 milliseconds, etc.) switch into VLC mode to detect VLC transmission by proximate vehicles. When switching to the VLC mode, the method continues at block 404. Otherwise, when switching to the image mode, the method continues at block 408.

At block 404, the VLC module 104 causes the lens 208 of the dual mode camera 106 to be removed from the light path 204. In some examples, the VLC module 104 sends a command signal to the dual mode camera 106. In some examples, the dual mode camera 106 pivots the lens 208 out of the light path 204 (FIG. 2B). In some examples, the dual mode camera 106 removes the lens 208 from the light path 204 via a track (FIG. 2C). At block 406, the VLC module 104 captures VLC data via the dual mode camera 106 in the VLC mode.

At block 408, the VLC module 104 causes the lens 208 of the dual mode camera 106 to enter (or remain in) the light path 204. In some examples, the VLC module 104 sends a command signal to the dual mode camera 106. In some examples, the dual mode camera 106 pivots the lens 208 into the light path 204 (FIG. 2A). In some examples, the dual mode camera 106 moves the lens 208 into the light path 204 via a track. At block 410, the camera module 102 captures images via the dual mode camera 106 in the image mode to, for example, analyze for autonomous or semi-autonomous features of the vehicle 100.

The flowchart of FIG. 4 is representative of machine readable instructions stored in memory (such as the memory 304 of FIG. 3) that comprise one or more programs that, when executed by a processor (such as the processor 302 of FIG. 3), cause the vehicle 100 to implement the example VLC module 104 of FIGS. 1 and 3. Further, although the example program(s) is/are described with reference to the flowchart illustrated in FIG. 4, many other methods of implementing the example VLC module 104 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a camera including a lens removable from a light path between an aperture and a CMOS sensor;
a visual light communication (VLC) module with a processor communicatively coupled to the camera to:
select between first and second modes,
when in the second mode, remove the lens from the light path, and receive VLC data via the camera; and
a camera module to capture images via the camera when the first mode is selected.

2. The vehicle of claim 1, wherein the camera includes a drive motor rotationally connected to an end of the lens.

3. The vehicle of claim 2, wherein, in response to receiving a command signal from the VLC module, the camera is to rotate the lens out of the light path.

4. The vehicle of claim 1, wherein the camera includes a track connected to the lens.

5. The vehicle of claim 4, wherein, in response to receiving a command signal from the VLC module, the camera is to move the lens into a cavity using the track.

6. The vehicle of claim 5, wherein the camera includes a semi-transparent panel connected to the track.

7. The vehicle of claim 6, wherein when the lens is moved into the cavity, the semi-transparent panel moves into the light path.

8. The vehicle of claim 7, wherein the semi-transparent panel includes a thin film that disperses the light evenly across the CMOS sensor.

9. A dual mode camera for a vehicle comprising:
a CMOS sensor;
a housing that defines an aperture through which light enters and a light path from the aperture to the CMOS sensor;
a lens removably positioned in the light path, the camera to remove the lens from the light path in response to receiving a command from a visual light communication (VLC) module of the vehicle.

10. The camera of claim 9, wherein the camera is to capture images when the lens is in the light path.

11. The camera of claim 9, wherein the camera is to capture VLC data when the lens is not in the light path.

12. The camera of claim 9, including a drive motor rotationally connected to an end of the lens.

13. The camera of claim 12, wherein, in response to receiving the command from the VLC module, the drive motor is to rotate the lens out of the light path.

14. The camera of claim 9, including a track connected to the lens.

15. The camera of claim 14, wherein, in response to receiving a command signal from the VLC module, the track is to move the lens into a cavity.

16. The camera of claim 15, including a semi-transparent panel connected to the track.

17. The camera of claim 16, wherein when the lens is moved into the cavity, the track is to move the semi-transparent panel into the light path.

18. The camera of claim 17, wherein the semi-transparent panel includes a thin film that disperses the light evenly across the CMOS sensor.

* * * * *